United States Patent Office 3,518,517
Patented June 30, 1970

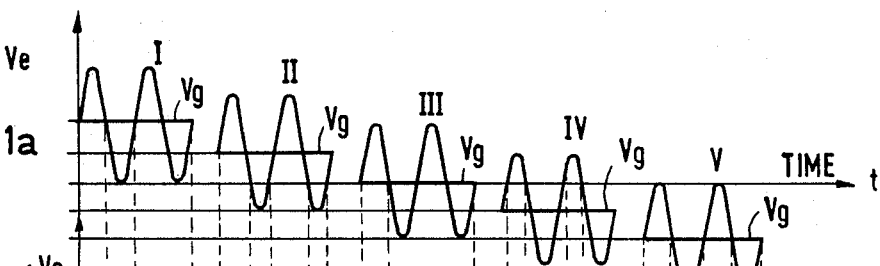
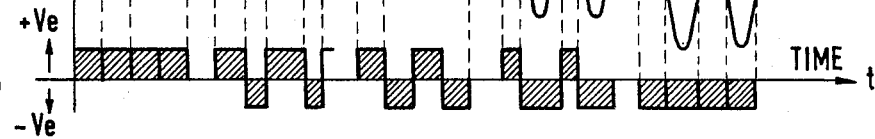
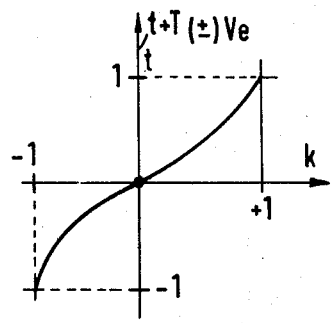
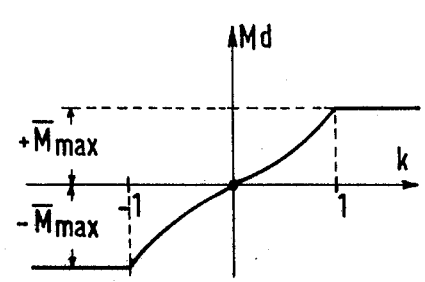
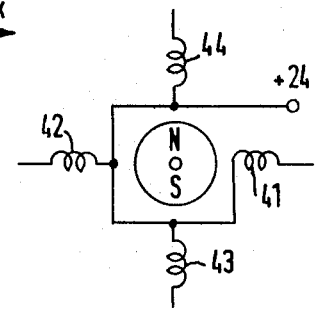
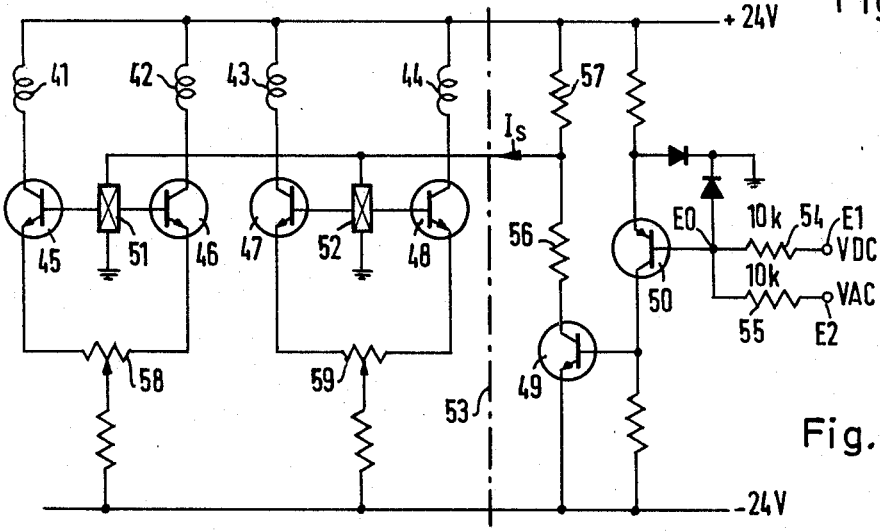

3,518,517
METHOD AND APPARATUS FOR CONTINUOUS REVERSAL OF BRUSHLESS DC MOTORS
Erich Rainer, Nuremberg, Germany, assignor to Siemens Aktiengesellschaft, a corporation of Germany
Filed July 25, 1967, Ser. No. 655,870
Claims priority, application Germany, Aug. 12, 1966, S 105,331
Int. Cl. H02k 29/00
U.S. Cl. 318—254                                    6 Claims

ABSTRACT OF THE DISCLOSURE

A brushless DC motor having motor windings and a control input connected to the motor windings for forward and reverse operation of the motor, is continuously reversed by superimposing an alternating electrical signal upon a direct electrical signal to produce a resultant superimposed electrical signal. The resultant superimposed electrical signal is applied to the control input of the motor in a manner whereby the phase sequence and motor torque for the direction of rotation of the motor is controlled in accordance with the polarity of the arithmetic average magnitude of the resultant electrical signal.

DESCRIPTION OF THE INVENTION

The present invention relates to brushless DC motors. More particularly, the invention relates to a method and apparatus for continuous reversal of brushless DC motors. A brushless DC motor is continuously reversed by a control input signal for forward and reverse operation.

It is often desirable that the moment of a motor correspond to and be proportional to the polarity of a control voltage provided by a source of control voltage. A standard commutator meets these requirements, of course. A brushless motor, which is electronically controlled, however, requires specific circuitry to fulfill these requirements.

The principal object of the present invention is to provide a new and improved method and apparatus for continuous reversal of brushless DC motors. The method and apparatus of the present invention for the continuous reversal of brushless DC motors require that the control device of the motor determine only the polarity of the control voltage and not the magnitude of said control voltage. The characteristic of the control signal is closely linear in the area of the zero or polarity changeover point. In the area of the zero or polarity changeover point, the mean value of the resultant sum voltage is exactly proportional to the direct control voltage V$g$. The shape of the characteristic of the control signal may be varied by variation of the shape of the alternating voltage which is superimposed upon the direct voltage to provide the control signal. The method and apparatus of the present invention are simple, but efficient, effective and reliable in operation.

In accordance with the present invention, a method for continuous reversal of a brushless DC motor having motor windings and a control input connected to the motor windings for forward and reverse operation of the motor, comprises superimposing an alternating electrical signal upon a direct electrical signal to produce a resultant superimposed electrical signal. The resultant superimposed electrical signal is applied to the control input of the motor in a manner whereby the phase sequence and motor torque for the direction of rotation of the motor is controlled in accordance with the polarity of the arithmetic average magnitude of the resultant electrical signal. Each of the alternating electrical signal, direct electrical signal and resultant superimposed electrical signal is an electrical voltage or an electrical current.

In accordance with the present invention, apparatus for continuous reversal of a brushless DC motor having motor windings and a control input connected to the motor windings for forward and reverse operation of the motor, comprises direct means for applying a direct electrical signal. Alternating means is provided for applying an alternating electrical signal. Superimposing means has an output and input connected to the direct and alternating means for superimposing the alternating electrical signal upon the direct electrical signal for producing a resultant superimposed electrical signal. Electrical connecting means connects the output of the superimposing means to the control input of the motor in a manner whereby the phase sequence and motor torque for the direction of rotation of the motor is controlled in accordance with the polarity of the arithmetic average magnitude of the resultant electrical signal.

The electrical connecting means comprises a switching amplifier responsive to polarity comprising a first transistor having emitter and collector electrodes and a base electrode connected to the output of the superimposing means. A second transistor has an emitter electrode, a base electrode connected to the collector electrode of the first transistor and a collector electrode connected to the control input of the motor. The first and second transistors are of opposite conductivity type.

In order that the present invention may be readily carried into effect, it will now be described with reference to the accompanying drawing, wherein:

FIG. 1a is a graphical presentation of the input voltage V$e$ of the apparatus for various magnitudes of the direct control voltage V$g$;

FIG. 1b is a graphical presentation illustrating the relationship of the sign or polarity of the input voltage V$e$ and the sign or polarity of (V$e$+A sin $\omega t$);

FIG. 2 is a graphical presentation illustrating the function $f(k) = 2/\pi$ arc sin $k$;

FIG. 3 is a graphical presentation of the idling moment of the motor as a function of the direct control voltage V$g$;

FIG. 4 is a circuit diagram of an embodiment of the apparatus of the present invention for continuous reversal of brushless DC motors; and FIG. 5 is a schematic diagram of the motor controlled by the circuit of FIG. 4.

The motor to be controlled is switched only in dependence upon the polarity of the direct control voltage V$g$ at full operating voltage in forward and reverse direction. The moment M$d$ of the motor shaft is desired to be proportional to the magnitude of the direct control voltage V$g$.

If a sinusoidal alternating voltage A sin $\omega t$ is superimposed upon the direct control voltage V$g$, then the input voltage V$e$ of the apparatus is $$Ve = Vg + A \sin \omega t$$

In FIG. 1a, the abscissa represents time $t$ and the ordinate represents the input voltage V$e$ for various magnitudes of the direct control voltage V$g$. The input voltage V$e$ is the input voltage to the apparatus of the present invention. Curve I of FIG. 1a shows the input voltage V$e$ when the direct control voltage V$g$ is equal to the amplitude of the superimposed alternating voltage A sin $\omega t$, or A. Curve II of FIG. 1a shows the input voltage V$e$ when the direct control voltage V$g$ is equal to half the amplitude of the superimposed alternating voltage A sin $\omega t$, or A/2.

Curve III of FIG. 1a shows the input voltage V$e$ when the direct control voltage V$g$ is equal to zero. Curve IV of FIG. 1a shows the input voltage V$e$ when the direct control voltage V$g$ is equal to half the amplitude of the superimposed alternating voltage $A \sin \omega t$ and is negative, or $-A/2$. Curve V of FIG. 1a shows the input voltage V$e$ when the direct control voltage V$g$ is equal to the amplitude of the superimposed alternating voltage $A \sin \omega t$ and is negative, or $-A$.

FIG. 1b shows the polarity or sign of the input voltage V$e$ relative to the polarity or sign of $(Ve+A \sin \omega t)$. In FIG. 1b, the abscissa represents time $t$ and the ordinate represents the sign or polarity of the input V$e$.

If, due to temperatures, the armature current of the motor is so limited that the motor may remain constantly completely idle, and if the direct voltage upon which the alternating voltage is superimposed is applied to the input of the apparatus, the mean moment M$d$ is $$Md = CmIm \int_{t}^{t+T} (\pm)(Vg + A \sin \omega t) dt$$

wherein M$d$ is the mean moment of the motor, I$m$ is the motor current and C$m$ is the proportionality constant between the motor current and the mean moment M$d$.

In evaluating the integral, $Vg = kA$ so that $$Ve = A(k + \sin \omega t) = A(k + \sin X)$$

when $X = \omega t$. The zero positions for $k + \sin X = 0$ are obtained for $$t1 = X1 = -\arc \sin k$$
$$t2 = X2 = \pi - X1 = \pi + \arc \sin k$$

Positive or negative moments are obtained for the direct control voltage V$g$, that is, for the angle $\Delta X+$ or $\Delta X-$. When $Ve > 0$, $$(\Delta X+) = (X2) - (X1) = \pi + \arc \sin k + \arc \sin k = \pi + 2 \arc \sin k$$

When $Ve < 0$, $$(\Delta X-) = (2\pi) - (X+) = 2\pi - \pi - 2 \arc \sin k = \pi - 2 \arc \sin k$$

Furthermore, the integral of the polarity of ($\pm$) function must be proportional to the angular difference $(\Delta X+)$ and $(\Delta X-)$, that is, $$(\Delta X+) - (\Delta X-) = \pi + 2 \arc \sin k - \pi + 2 \arc \sin k = 4 \arc \sin k$$

Arc sin $k$ is a maximum when $k = 1$. Arc sin $k$ is then $\pi/2$, so that $(\Delta X+) - (\Delta X-) = 2\pi$. Thus, the angular difference $(\Delta X+) - (\Delta X-)$ divided by $2\pi$ is the integral of the polarity function of the input voltage V$e$. The following equation is then obtained $$\int_{t}^{t+T} (\pm) Ve \, dt = \int_{t}^{t+T} (\pm) A(k + \sin \omega t) dt$$
$$= 2/\pi \arc \sin k = f(k)$$

FIG. 2 illustrates the function $f(k)$. In FIG. 2, the abscissa represents the factor $k$ and the ordinate represents the integral $$\int_{t}^{t+T} (\pm) Ve$$

The function $f(k)$ has a specific slope of $2/\pi = 0.637$ at the zero or polarity changeover point. The function $f(k)$ is substantially linear at the zero point in the first approximation, and this is important for the zero adjustment or control. Thus, in the first approximation, for very small magnitudes of the direct control voltage V$g$, the mean moment M$d$ of the motor is the curve $$Md = 0.637 k (Cm)(Im)$$

When $k$ is less or equal to 0.64, the devation of the slope is less than or equal to 30%. When $k$ is equal to or greater than $\pm 1$, $f(k) = \pm 1$, whereby the motor is completely controlled in corresponding direction of rotation.

FIG. 3 illustrates the idling moment of the motor as a function of the direct control voltage V$g$. The relation between the moment of the motor and the factor $k$ is completely linear when the alternating voltage superimposed upon the direct control voltage V$g$ is of triangular waveshape. Such a voltage is readily provided by integration of a rectangular alternating voltage.

In FIG. 3, the abscissa represents the factor $k$ and the ordinate represents the mean moment M$d$. The curve $Md = f(k)$ of FIG. 3 may be shaped as desired by the appropriate selection of the waveshape of the alternating voltage which is superimposed upon the direct control voltage V$g$.

FIG. 4 is a circuit for accomplishing the method of the present invention and illustrates the apparatus of the present invention. The motor comprises windings 41, 42, 43 and 44, as also shown in FIG. 5. The circuit of FIG. 4 is divided by a broken line 53 into the input part, to the right of such line, and the motor control part, to the left of such line.

A plurality of NPN type transistors 45, 46, 47, 48 and 49, a PNP type transistor 50 and a pair of Hall devices or generators 51 and 52 are included in the circuit. The transistors 49 and 50 are connected as a very steep switching amplifier which provides either a positive or a negative current Is for the Hall devices 51 and 52.

A direct voltage VDC is applied to an input terminal E$^1$ and an alternating voltage VAC is applied to an input terminal E$^2$. The alternating voltage VAC is superimposed upon the direct voltage VDC via the 10 kilohm resistors 54 and 55 so that the superimposed voltages are provided at the point EO.

The base electrode of the transistor 49 and the collector electrode of the transistor 50 are connected to each other. The common point EO is directly connected to the base electrode of the transistor 50 and the collector electrode of said transistor is connected to a point at ground potential via a rectifier. The current Is is provided at a common point between a pair of collector resistors 56 and 57 connected in series to the collector electrode of the transistor 49.

The windings 41, 42, 43 and 44 of the motor are connected in parallel to a +24 volts line. The winding 41 is connected in series with the emitter-collector path of the transistor 45 to one end of a variable resistor 58. The winding 42 is connected in series with the emitter-collector path of the transistor 46 to the other end of the variable resistor 58. The base electrode of the transistor 45 is connected to one Hall voltage output electrode of the Hall device 51 and the base electrode of the transistor 46 is connected to the other Hall voltage output electrode of said Hall device. The movable electrode of the variable resistor 58 is connected to a $-24$ volts line via a resistor.

The winding 43 is connected in series with the emitter-collector path of the transistor 47 to one end of a variable resistor 59. The winding 44 is connected in series with the emitter-collector path of the transistor 48 to the other end of the variable resistor 59. The base electrode of the transistor 47 is connected to one Hall voltage output electrode of the Hall device 52 and the base electrode of the transistor 48 is connected to the other Hall voltage output electrode of said Hall device. The movable electrode of the variable resistor 59 is connected to the $-24$ volts line via a resistor.

When a positive voltage is provided at the point EO, the transistor 50 is switched to its non-conductive condition and the transistor 49 is therefore switched to its non-conductive condition. The current Is is then supplied to the Hall devices 51 and 52 is positive and the motor (FIG. 5) is rotated in one direction via the corresponding transistors and motor windings.

When a negative voltage is provided at the point EO, the transistor 50 is switched to its conductive condition and the transistor 49 is therefore switched to its conductive condition. The current Is is then supplied to the Hall devices 51 and 52 is negative and the motor (FIG. 5) is rotated in the opposite or reverse direction via the corresponding transistors and motor windings.

While the invention has been described by means of a specific example and in a specific embodiment, I do not wish to be limited thereto, for obvious modifications will occur to those skilled in the art without departing from the spirit and scope of the invention.

I claim:

1. A method for continuous reversal of the phase sequence of the motor torque for the clockwise and counterclockwise rotation of a brushless DC motor having a common control input for the clockwise and counterclockwise rotation of the motor, said method comprising applying a reversible direct voltage to said control input and superimposing an alternating voltage upon said direct voltage to produce a resultant superimposed electrical signal and applying said resultant superimposed electrical signal to the control input of said motor in a manner whereby the phase sequence and motor torque for the clockwise and counterclockwise direction of rotation of said motor is controlled in accordance with the polarity of the arithmetic average magnitude of said resultant electrical signal.

2. Apparatus for continuous reversal of the phase sequence of the motor torque for the clockwise and counterclockwise rotation of a brushless DC motor having a common control input for the clockwise and counterclockwise rotation of the motor, said apparatus comprising direct means for applying a reversible direct voltage; alternating means for applying an alternating voltage; superimposing means having an output and inputs connected to said direct and alternating means for superimposing said alternating voltage upon said direct voltage for producing a resultant superimposed electrical signal; and electrical connecting means connecting the output of said superimposing means to the control input of said motor in a manner whereby the phase sequence and motor torque for the clockwise and counterclockwise direction of rotation of said motor is controlled in accordance with the polarity of the arithmetic average magnitude of said resultant electrical signal.

3. Apparatus as claimed in claim 2, wherein said electrical connecting means comprises a switching amplifier responsive to polarity.

4. Apparatus as claimed in claim 2, wherein said electrical connecting means comprises a switching amplifier responsive to polarity comprising a pair of transistors.

5. Apparatus as claimed in claim 2, wherein said electrical connecting means comprises a switching amplifier responsive to polarity comprising a first transistor having emitter and collector electrodes and a base electrode connected to the output of said superimposing means and a second transistor having an emitter electrode, a base electrode connected to the collector electrode of said first transistor and a collector electrode connected to the control input of said motor.

6. Apparatus as claimed in claim 5, wherein said first and second transistors are of opposite conductivity type.

References Cited

UNITED STATES PATENTS

| | | | |
|---|---|---|---|
| 1,835,550 | 12/1931 | Wolfert | 318—290 |
| 2,782,347 | 2/1957 | Herbst | 318—288 XR |
| 2,807,768 | 9/1957 | Sherlock et al. | 318—345 XR |
| 3,159,777 | 12/1964 | Manteuff et al. | 318—254 XR |
| 3,199,009 | 8/1965 | Lien et al. | 318—138 |
| 3,308,307 | 3/1967 | Moritz | 318—290 |
| 3,416,054 | 12/1968 | Galles | 318—281 |

GLEN R. SIMMONS, Primary Examiner

U.S. Cl. X.R.

318—138, 281, 290